(12) United States Patent
Sullivan (10) Patent No.: US 9,692,474 B2
(45) Date of Patent: Jun. 27, 2017

(54) MOBILE PHONE GLOVE

(71) Applicant: James Vincent Sullivan, The Colony, TX (US)

(72) Inventor: James Vincent Sullivan, The Colony, TX (US)

(*) Notice: Subject to any disclaimer, the term of this patent is extended or adjusted under 35 U.S.C. 154(b) by 0 days.

(21) Appl. No.: 15/043,497

(22) Filed: Feb. 12, 2016

(65) Prior Publication Data
US 2016/0241286 A1 Aug. 18, 2016

Related U.S. Application Data

(60) Provisional application No. 62/115,826, filed on Feb. 13, 2015.

(51) Int. Cl.
*H04M 1/00* (2006.01)
*H04B 1/3827* (2015.01)
*H04B 1/3888* (2015.01)

(52) U.S. Cl.
CPC .......... *H04B 1/385* (2013.01); *H04B 1/3888* (2013.01); *H04B 2001/3861* (2013.01)

(58) Field of Classification Search
CPC .............. H04B 1/385; H04B 1/3827; H04B 2001/3866; H04B 1/38; H04B 1/3888; H04B 2001/3861; G06F 2203/0331; G06F 3/03545; G06F 3/014; A41D 19/002; A41D 19/0024; A41D 19/0031; A42D 19/002; G09B 19/0038
USPC ....... 455/550.1, 78, 552.1, 474.7, 76, 575.6, 455/575.7; 348/473, 373; 700/94
See application file for complete search history.

(56) References Cited

U.S. PATENT DOCUMENTS

| | | | | |
|---|---|---|---|---|
| 5,003,637 A | * | 4/1991 | Lonon ................ | A41D 19/0024 2/160 |
| 5,987,310 A | * | 11/1999 | Gray ...................... | H04B 1/385 455/100 |
| 7,988,511 B2 | * | 8/2011 | Bissell, IV ............. | B63C 11/02 441/96 |
| 9,344,537 B2 | * | 5/2016 | Khan ................... | H04M 1/0202 |
| 2005/0210562 A1 | * | 9/2005 | Johnson ............. | A41D 19/0031 2/159 |
| 2005/0223469 A1 | * | 10/2005 | Banton ............ | A41D 19/01547 2/160 |
| 2006/0221066 A1 | * | 10/2006 | Cascella ................. | G06F 3/014 345/179 |
| 2007/0083979 A1 | * | 4/2007 | Daniels ................ | A41D 19/002 2/160 |
| 2011/0289654 A1 | * | 12/2011 | Williams ........... | A41D 19/0024 2/167 |
| 2014/0165261 A1 | * | 6/2014 | Morris ................. | A41D 19/002 2/160 |
| 2015/0289575 A1 | * | 10/2015 | Krautner ............ | A41D 19/0024 2/160 |
| 2017/0086519 A1 | * | 3/2017 | Vigano' ............. | A41D 19/0027 |

* cited by examiner

*Primary Examiner* — Mahendra Patel
(74) *Attorney, Agent, or Firm* — Southern Methodist University Dedman School of Law (57) ABSTRACT

A method and apparatus for managing a mobile phone. In one illustrative example, an apparatus comprises a garment having a glove-type shape, a pocket attached to a side of the garment, and a receptacle for holding a mobile device that has a touchscreen. The receptacle is attached to the garment through the pocket. The receptacle is comprised of a material that enables a user to interact with the touchscreen of the mobile device.

15 Claims, 10 Drawing Sheets

MOBILE PHONE GLOVE

CROSS-REFERENCE TO RELATED APPLICATION

This application claims the benefit of U.S. Provisional Application No. 62/115,826, filed Feb. 13, 2015, which is incorporated herein by reference.

BACKGROUND INFORMATION

1. Field

The present disclosure relates generally to managing a model of a product structure for a product and, in particular, to a method and apparatus for using the model to manage and present information about variations in the product structure for the product.

2. Field

The present disclosure relates generally to wearable items and, in particular, to a wearable item for holding a mobile device. Still more particularly, the present disclosure relates to a wearable item for encasing a mobile device that has a touchscreen, while still allowing a user to operate the mobile device.

3. Background

As technology advances, mobile phones are being used to perform an increasing number of tasks. One such task is taking photos. However, carrying a mobile phone on one's person at all times is not always convenient. Performing tasks, such as taking photos, using a mobile phone may be more difficult than desired when a user is running, swimming, or performing some other type of motion-based activity. For example, when a person goes snorkeling or scuba diving, carrying a mobile phone underwater and operating that mobile phone underwater may be more inconvenient than desired. Operating a mobile phone to take pictures while a person is in motion may be more difficult than desired. For example, taking photos or video using a mobile phone while on a roller coaster or a water slide may be more difficult than desired.

SUMMARY

In one illustrative embodiment, an apparatus comprises a garment having a glove-type shape, a pocket attached to a side of the garment, and a receptacle for holding a mobile device that has a touchscreen. The receptacle is attached to the garment through the pocket. The receptacle is comprised of a material that enables a user to interact with the touchscreen of the mobile device.

The features and functions can be achieved independently in various embodiments of the present disclosure or may be combined in yet other embodiments in which further details can be seen with reference to the following description and drawings.

BRIEF DESCRIPTION OF THE DRAWINGS

The illustrative embodiments, as well as a preferred mode of use, further objectives and features thereof, will best be understood by reference to the following detailed description of an illustrative embodiment of the present disclosure when read in conjunction with the accompanying drawings, wherein.

DETAILED DESCRIPTION

The illustrative embodiments take into account that it may be desirable to have a wearable item capable of holding a mobile phone, while keeping the mobile phone protected and still allowing a user to manually operate the mobile phone. For example, without limitation, the illustrative embodiments take into account that it may be desirable to have a wearable item that allows a user to protect a mobile phone when the user goes underwater, while still allowing the user to easily operate the phone.

Thus, the illustrative embodiments provide an apparatus for allowing a user to wear a mobile phone in a manner that allows the user to easily operate the mobile phone and hold the mobile phone without impeding use of the user's fingers in an undesired manner. In one illustrative example, the apparatus comprises a garment having a glove-type shape, a pocket attached to a side of the garment, and a receptacle for holding a mobile device that has a touchscreen. The receptacle is attached to the garment through the pocket. The receptacle is comprised of a material that enables a user to interact with the touchscreen of the mobile device.

Referring now to the figures, the same reference numeral may be used in more than one figure. This reuse of a reference numeral in different figures represents the same element in the different figures.

Figure 1:
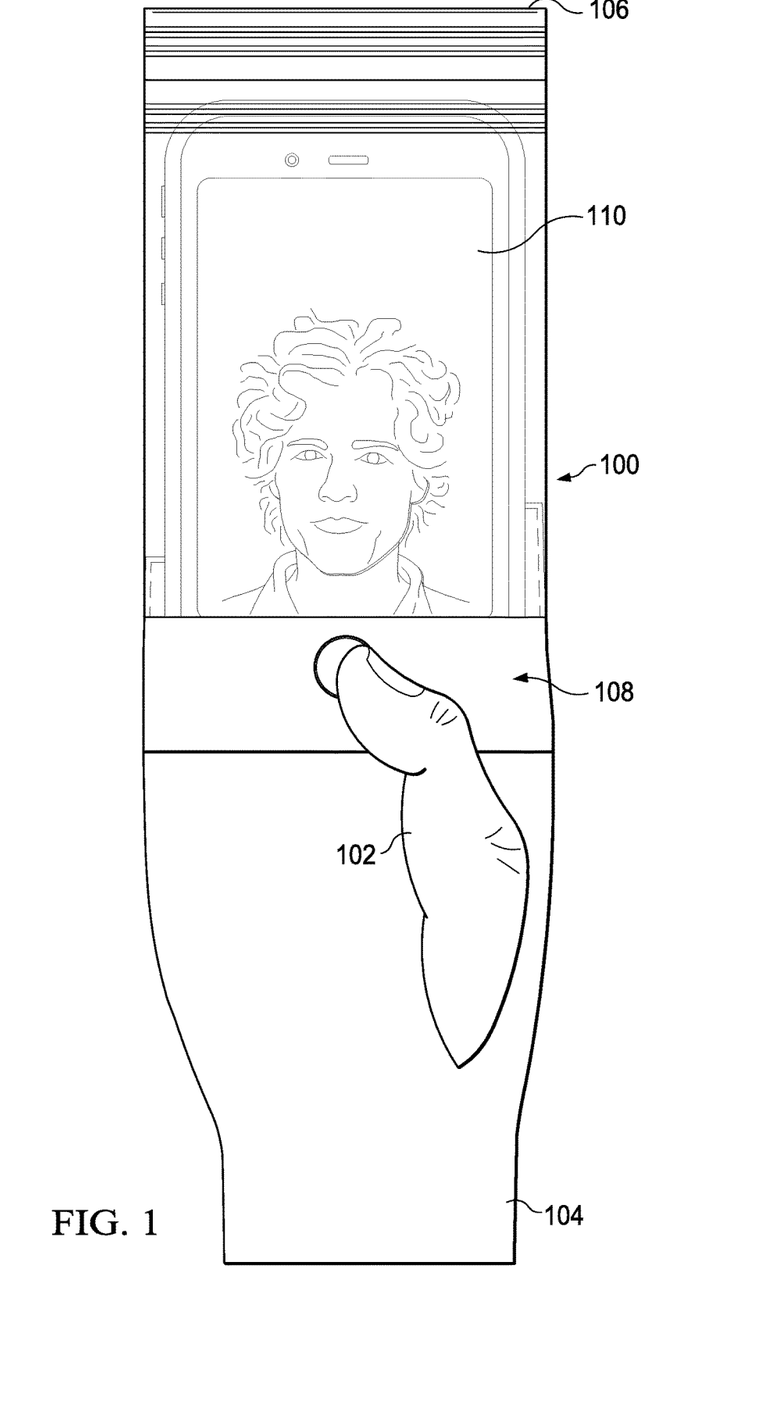
FIG. 1 is an illustration of a mobile phone glove.

With reference to FIG. 1, an illustration of a mobile phone glove is depicted in accordance with an illustrative embodiment. In this illustrative example, mobile phone glove 100 is worn over hand 102 of a user. Mobile phone glove 100 includes garment 104, receptacle 106, and pocket 108.

Pocket 108 is attached to garment 104. Receptacle 106 is attached to both pocket 108 and garment 104 in this illustrative example.

As used herein, when an item is "attached to" another item, this attachment is a physical association between the two items. Further, a first item, such as pocket 108, may be attached to a second item, such as garment 104, indirectly or directly. Still further, a first item, such as pocket 108, may be attached to a second item, such as garment 104, by being at least one of secured to the second item, bonded to the second item, fastened to the second item, glued to the second item, sewn to the second item, or connected to the second item in some other suitable manner. The first item also may be indirectly attached to the second item using a third item. In some cases, the first item may be considered to be attached to the second item by being formed as part of the second item, as an extension of the second component, or both.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

As depicted, mobile phone 110 has been placed within receptacle 106 of mobile phone glove 100. Receptacle 106 enables the user to operate touchscreen 112 of mobile phone 110 while mobile phone 110 is located within receptacle 106. Further, receptacle 106 is attached to garment 104 through pocket 108 in a manner that does not impair the user's ability to use the user's fingers more than desired.

The various components that make up mobile phone glove 100 are described in greater detail in FIGS. 2-9. Further, an example of one manner in which mobile phone glove 100 may be constructed is described in FIGS. 2-9.

Figure 2:
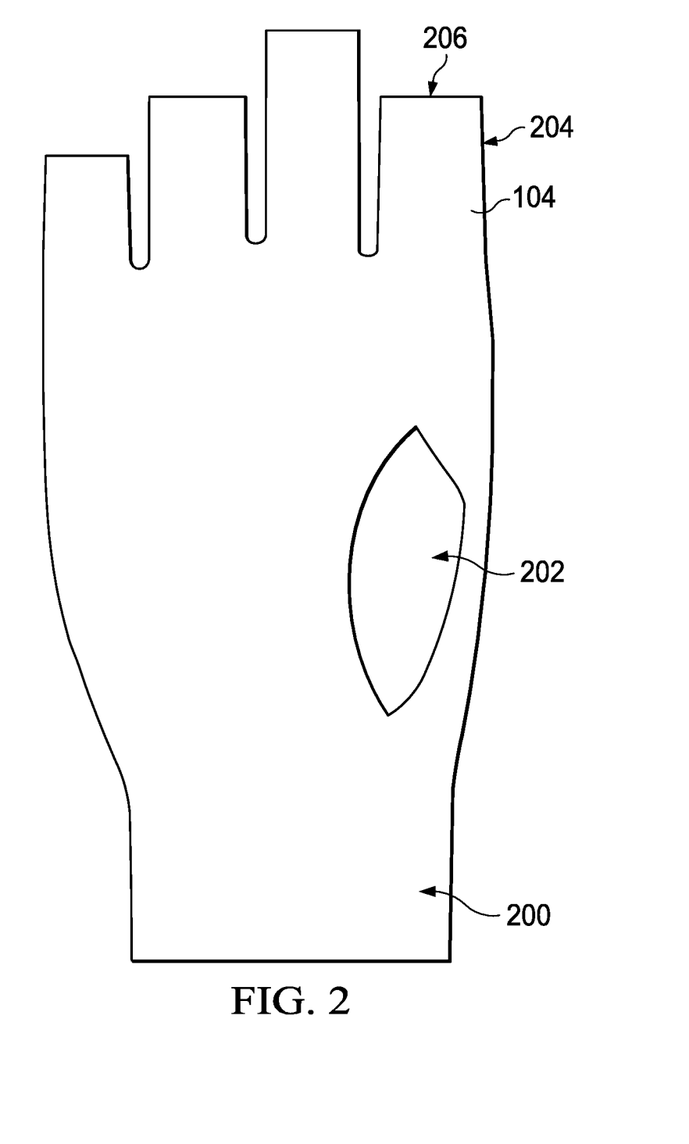
FIG. 2 is an illustration of a garment.

With reference now to FIG. 2, an illustration of a garment is depicted in accordance with an illustrative embodiment. Garment 104 is a wearable item. Garment 104 has a shape that enables garment 104 to be worn on a portion of a person's body.

In one illustrative example, garment 104 has glove-type shape 200 that enables garment 104 to be worn on the hand of a person, such as hand 102 in FIG. 1. In some illustrative examples, garment 104 is comprised of a material that enables garment 104 to stretch or otherwise substantially conform to the shape of a particular hand. In other illustrative examples, garment 104 may have a mitten-type shape, a sleeve-type shape, or some other type of shape.

In one illustrative example, garment 104 has opening 202. Opening 202 is shaped to allow a thumb of a hand to pass through opening 202 when garment 104 is worn on the hand. Garment 104 also has plurality of extensions 204 having plurality of openings 206. In other words, each of plurality of extensions 204 is open-ended. In this manner, plurality of extensions 204 are for the fingers of a hand.

In other illustrative examples, plurality of extensions 204 may not have plurality of openings 206. Rather, plurality of extensions 204 may be closed-ended. When plurality of extensions 204 is closed-ended, the tips of plurality of extensions 204 may be touch-sensitive to allow the user to operate a touchscreen, such as touchscreen 112 in FIG. 1.

In still other illustrative examples, garment 202 may have an extension for the thumb of the user instead of opening 202. This extension (not shown) may be open-ended or closed-ended, depending on the implementation. When the extension is closed-ended, the tip of the extension may be comprised of a capacitive or touch-sensing material that enables the user to interact with touchscreen 112 in FIG. 1 using the tip.

In some illustrative examples, garment 104 may not have plurality of extensions 204. Rather, garment 104 may have a section for enclosing the four fingers of a user other than the thumb. In these types of examples, the shape of garment 104 may be a mitten-type shape. In still other illustrative examples, plurality of extensions 204 may be replaced by a single opening for the four fingers of a hand other than the thumb. In this manner, garment 104 may have a sleeve-type shape.

Garment 104 may be comprised of one or more materials. For example, without limitation, garment 104 may be comprised of fabric, nylon, plastic, leather, or some other type of material. In one illustrative example, garment 104 is comprised of a weatherproof or water-resistant fabric.

Figure 3:
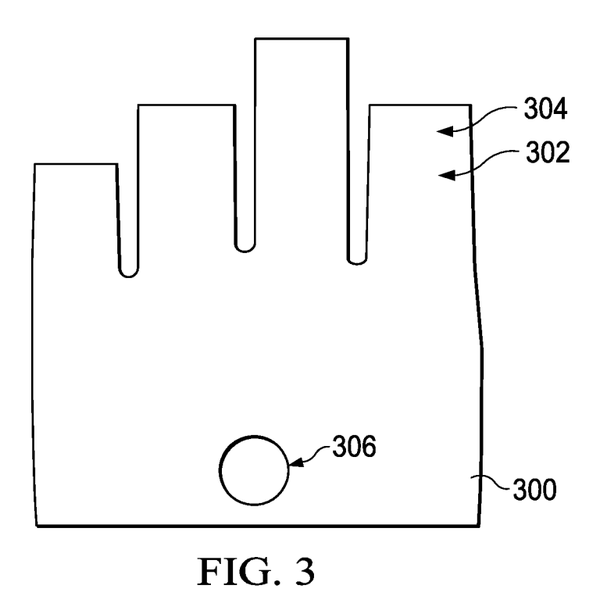
FIG. 3 is an illustration of a pocket material.

With reference now to FIG. 3, an illustration of a pocket material is depicted in accordance with an illustrative embodiment. Pocket material 300 may be used to form pocket 108 in FIG. 1.

Pocket material 300 may be a piece of fabric, nylon, plastic, or some other type of material. Pocket material 300 has shape 302. Shape 302 is designed to substantially conform to at least a portion of the shape of garment 104 described in FIG. 2.

In this illustrative example, shape 302 of pocket material 302 substantially conforms to glove-type shape 200 of garment 104 in FIG. 2. As depicted, pocket material 300 has plurality of extensions 304. Plurality of extensions 304 may be shaped to substantially conform to plurality of extensions 204 of garment 104 in FIG. 2.

Further, pocket material 300 also has hole 306. In this illustrative example, hole 306 is shaped to allow visibility of a button on mobile phone 110 in FIG. 1 after pocket material 300 has been used to form pocket 108 shown in FIG. 1. The button may be, for example, without limitation, the home button on mobile phone 110 in FIG. 1.

In other illustrative examples, hole 306 may be replaced by a transparent or translucent piece of material that provides a similar type of visibility of the button on mobile phone 110 in FIG. 1. In still other illustrative examples, hole 306 may not be needed because the button on a particular mobile phone is positioned at a top or side of the mobile phone.

Figure 4:
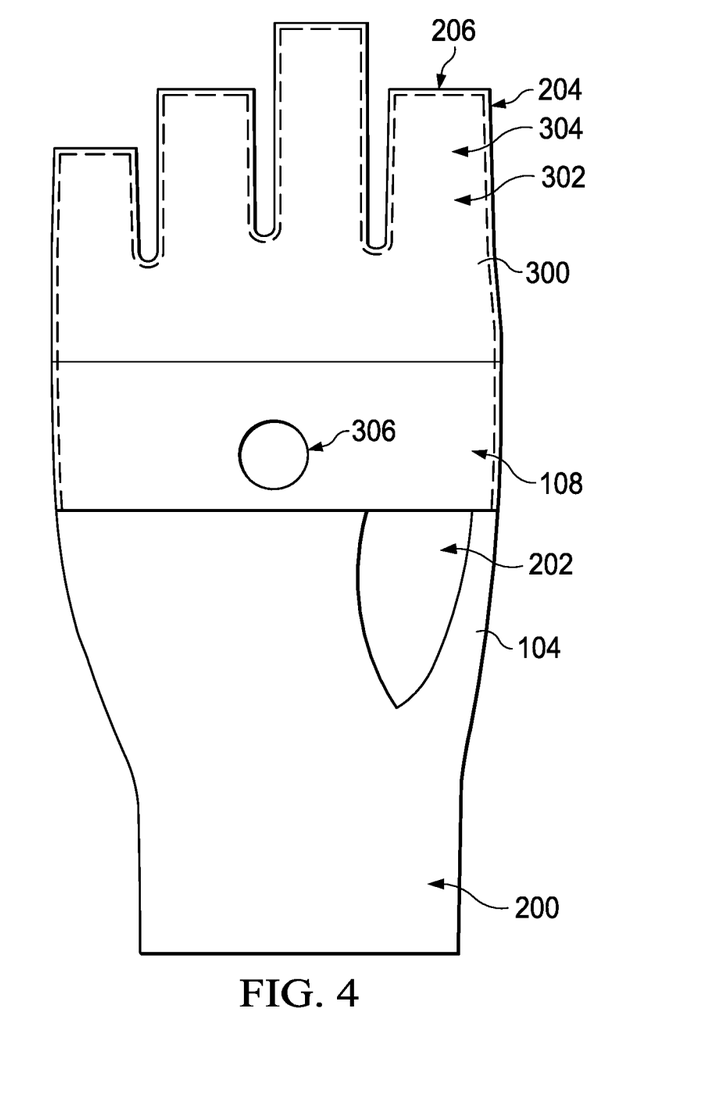
FIG. 4 is an illustration of a pocket material attached to a garment.

With reference now to FIG. 4, an illustration of a pocket material attached to a garment is depicted in accordance with an illustrative embodiment. In FIG. 4, pocket material from FIG. 3 is shown attached to a side of garment 104 from FIG. 2. In one illustrative example, pocket material 300 may be sewn onto a portion of garment 104. In particular, first section 400 of pocket material 300 is sewn onto garment 104.

In this illustrative example, first section 400 may include plurality of extensions 304 of pocket material 300, which may be sewn onto plurality of extensions 204 of garment 104. A portion of pocket material 300 is not sewn onto garment 104. In this illustrative example, second section 402 of pocket material 300 is not sewn onto garment 104. Second section 402 may be referred to as a flap in some case.

Figure 5:
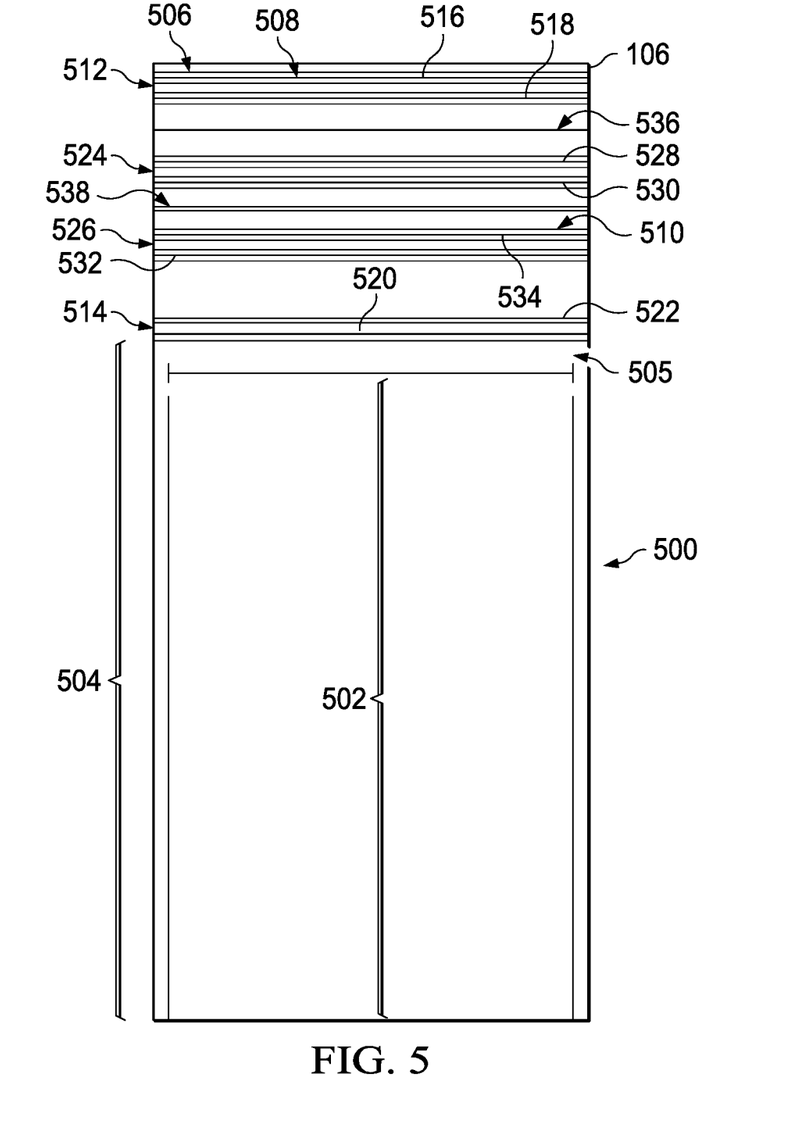
FIG. 5 is an illustration of a receptacle.

With reference now to FIG. 5, an illustration of a receptacle is depicted in accordance with an illustrative embodiment. In FIG. 5, receptacle 106 from FIG. 1 is shown in greater detail.

Receptacle 106 is comprised of material 500 that enables a user to interact with touchscreen 112 of mobile phone 110 in FIG. 1. For example, without limitation, at least a portion of material 500 may be at least one of capacitive, touch-sensing, touch-sensitive, pressure-sensitive, or otherwise conductive to allow a user to interact with touchscreen 112 of mobile phone 110 in FIG. 1 when mobile phone 110 is place inside receptacle 106. Depending on the implementation, material 500 may be comprised of a plastic material, a vinyl material, or a combination thereof.

In this illustrative example, a mobile device, such as mobile phone 110, in FIG. 1 may be placed within selected area 502 of receptacle. Selected area 502 is at least partially surrounded by outer area 504. Outer area 504 around selected area 502 may take the form of sealed area 505.

Seal mechanism 506 is attached to receptacle 106. Seal mechanism 506 is used to make receptacle 106 watertight. Depending on the implementation, seal mechanism 506 may be used to make receptacle 106 airtight. Seal mechanism 506 may be implemented in different ways.

In one illustrative example, seal mechanism 506 includes interlocking members that may be interlocked to form a watertight and/or airtight seal for receptacle 106. For example, without limitation, seal mechanism 506 may include first plurality of interlocking members 508 and second plurality of interlocking members 510.

First plurality of interlocking members 506 includes first pair of interlocking members 512 and second pair of interlocking members 514. First pair of interlocking members 512 is configured to engage second pair of interlocking members 514. For example, first pair of interlocking members 512 may include first interlocking member 516 and second interlocking member 518. Second pair of interlocking members 514 may include first interlocking member 520 and second interlocking member 522.

Further, second plurality of interlocking members 510 includes third pair of interlocking members 524 and fourth pair of interlocking members 426. Third pair of interlocking members 524 is configured to engage fourth pair of interlocking members 526. For example, third pair of interlocking members 524 may include first interlocking member 528 and second interlocking member 530. Fourth pair of interlocking members 526 may include first interlocking member 532 and second interlocking member 534.

A mobile phone, such as mobile phone 110 in FIG. 1, may be inserted into receptacle 106 through opening 536. Once the mobile phone 110 has been positioned within selected area 502, the top portion of receptacle 106 may be folded at fold area 538. As depicted, first pair of interlocking members 512 is positioned above opening 536, while second pair of interlocking members 512 is positioned below opening 536 and below fold area 538. Third pair of interlocking members 524 is positioned below opening 536 but above fold area 538. Fourth pair of interlocking members 526 is positioned below fold area 538.

When receptacle 106 is folded at fold area 538, first pair of interlocking members 512 engages second pair of interlocking members 514. Further, third pair of interlocking members 524 may be engaged with fourth pair of interlocking members 526. In these illustrative examples, when one interlocking member engages, or "interlocks" with, another interlocking member, a seal is formed.

In this illustrative example, first interlocking member 516 and second interlocking member 518 engage first interlocking member 520 and second interlocking member 522, respectively. As one illustrative example, first interlocking member 516 and second interlocking member 518 may take the form of male plastic strips, while first interlocking member 520 and second interlocking member 522 may take the form of female plastic strips. The male plastic strips may interlock with the female plastic strips to form a watertight and/or airtight seal. Similarly, first interlocking member 528 and second interlocking member 530 engage first interlocking member 532 and second interlocking member 534, respectively. In this manner, four different seals are created.

In one illustrative example, first pair of interlocking members 512 and second pair of interlocking members 514 may together form a first snap system of seal mechanism 506. Further, third pair of interlocking members 524 and fourth pair of interlocking members 526 may together form a second snap system of seal mechanism 506.

Although seal mechanism 506 is described above as using interlocking plastic strips to form a watertight and/or airtight seal for receptacle, other types of sealing devices may be used. For example, without limitation, at least one of a group of fasteners, adhesive, glue, a zipper system, a hook and loop fastener, or some other of sealing mechanism may be used to create one or more seals.

Figure 6:
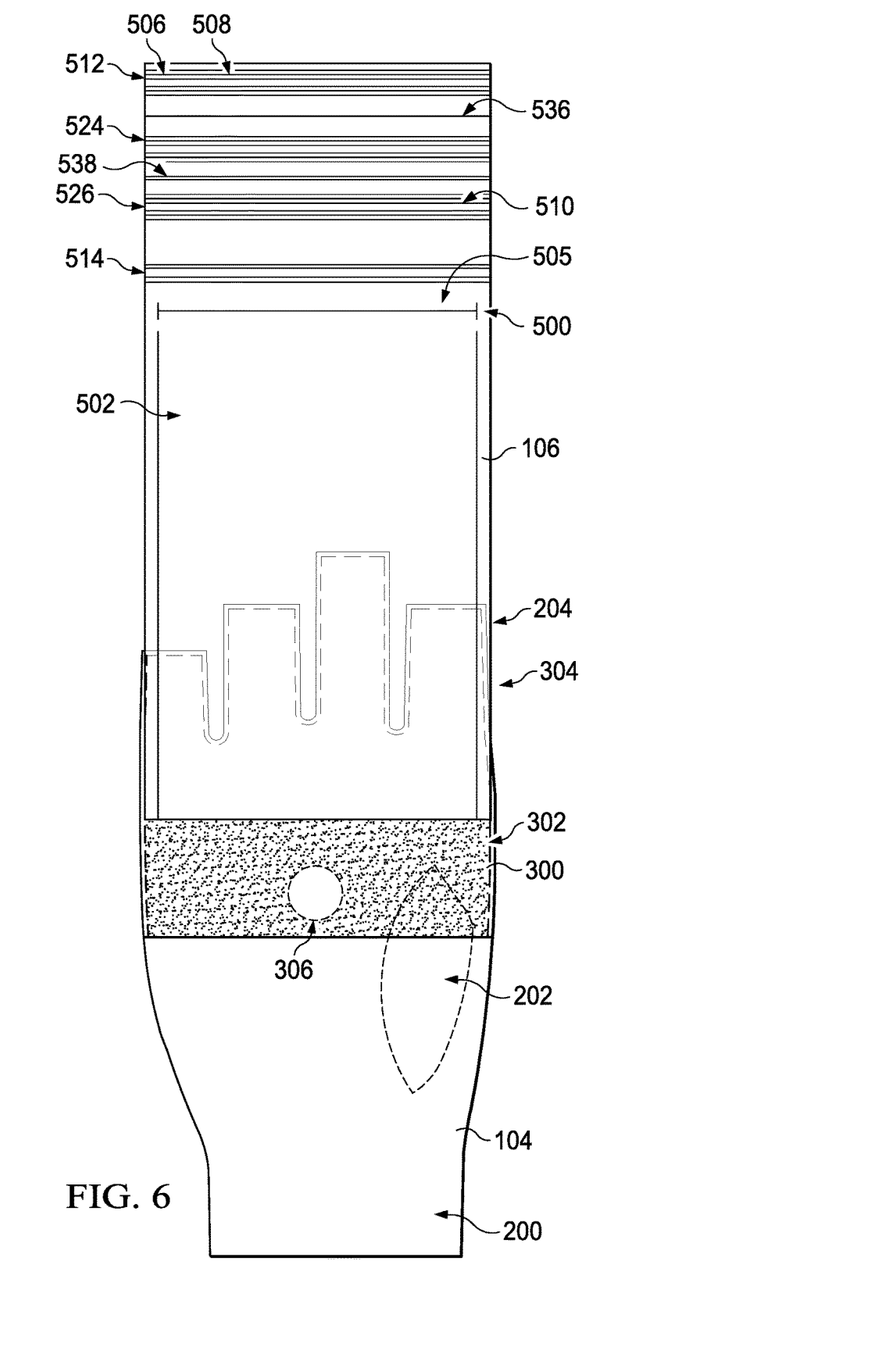
FIG. 6 is an illustration of a receptacle attached to a garment.

With reference now to FIG. 6, an illustration of a receptacle attached to a garment is depicted in accordance with an illustrative embodiment. Receptacle 106 from FIG. 5 has been attached to pocket material 300. As depicted, receptacle 106 extends out past plurality of extensions 204. In one illustrative example, a portion of receptacle 106 may be sewn onto pocket material 300.

Figure 7:
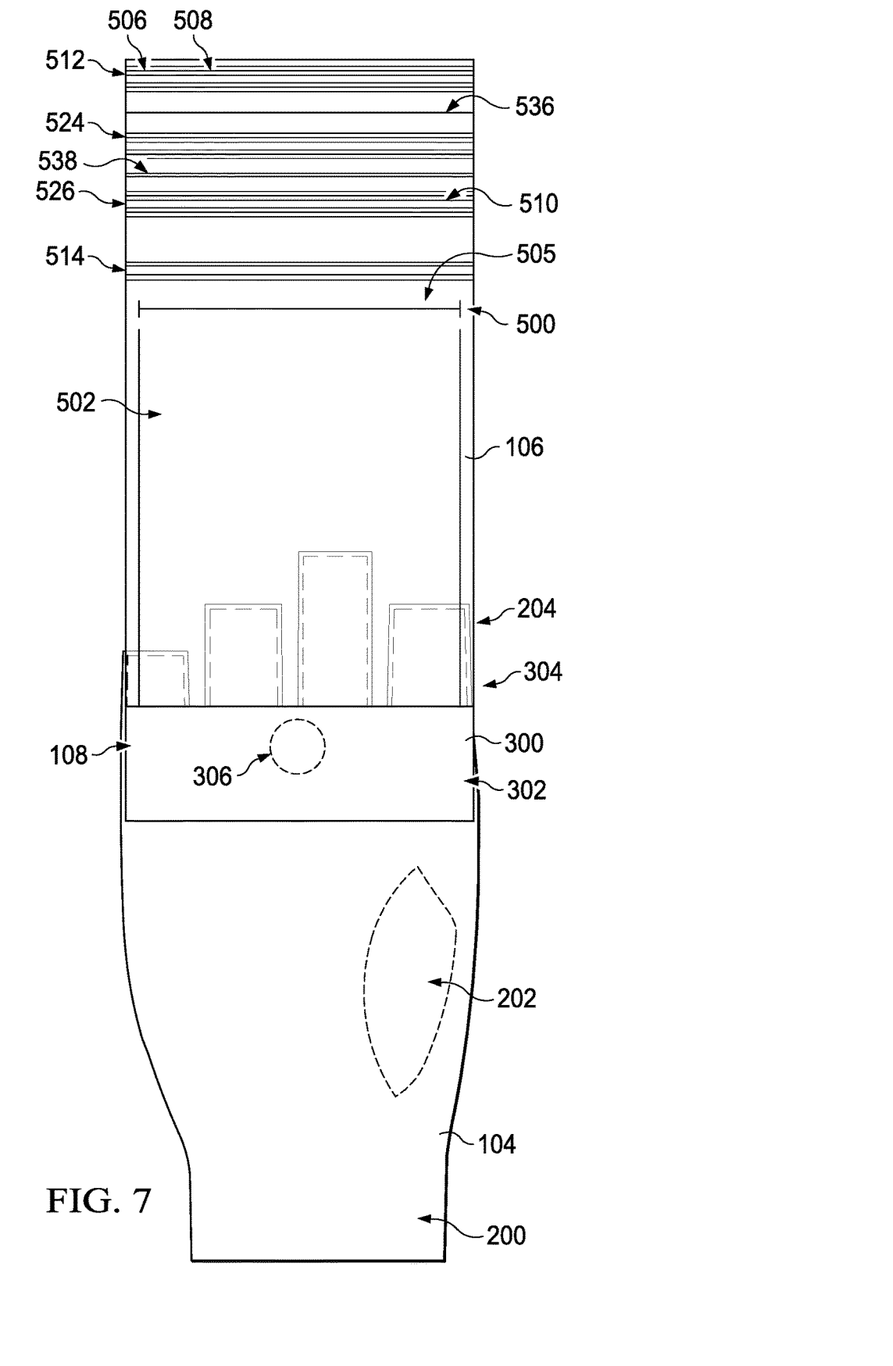
FIG. 7 is an illustration of a fully formed mobile phone glove.

With reference now to FIG. 7, an illustration of a fully formed mobile phone glove is depicted in accordance with an illustrative embodiment. Second section 402 of pocket material 300 has been folded up over a bottom portion of receptacle 106.

Second section 402 is attached receptacle 106 and three sides of first section 400 of pocket material 300 from FIG. 4 to form pocket 108. In one illustrative example, second section 402 is sewn onto and through outer area 504 of receptacle 106 and onto and through first section 400 of pocket material 300 to form pocket 108. Pocket 108 forms an interior space within which a bottom portion of receptacle 106 is cradled.

Figure 8:
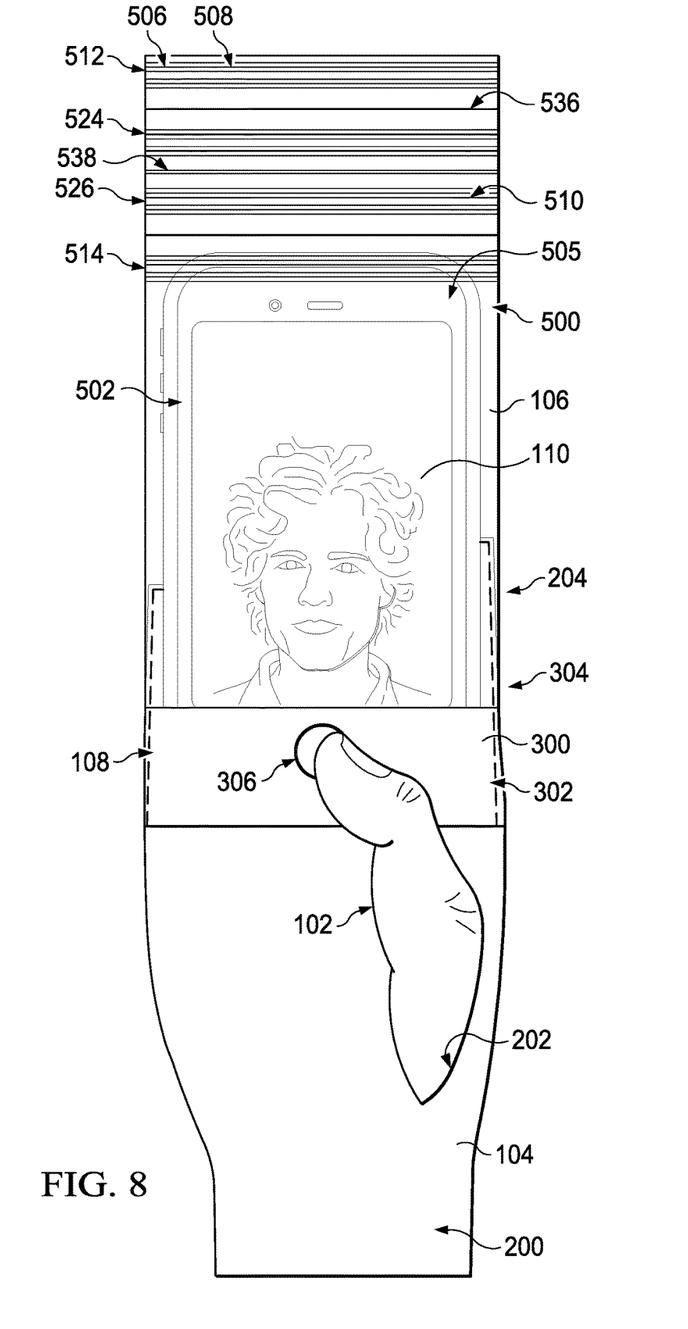
FIG. 8 is an illustration of a mobile phone placed in a receptacle of a mobile phone glove.

With reference now to FIG. 8, an illustration of a mobile phone placed in a receptacle of a mobile phone glove is depicted in accordance with an illustrative embodiment. In FIG. 8, the user is wearing mobile phone glove 100 over hand 102.

Mobile phone 110 has been placed into receptacle 106. Receptacle 106 stabilizes mobile phone relative to garment 104. Receptacle 106 has not yet been sealed. Receptacle 106 may be sealed using seal mechanism 506 to fully enclose mobile phone 110 and create a watertight and/or airtight seal around mobile phone 110. As depicted, mobile phone glove 100 enables a user to wear mobile phone 110 in a manner that allows the user to easily operate mobile phone 110 without impairing the use of the user's fingers more than desired.

Figure 9:
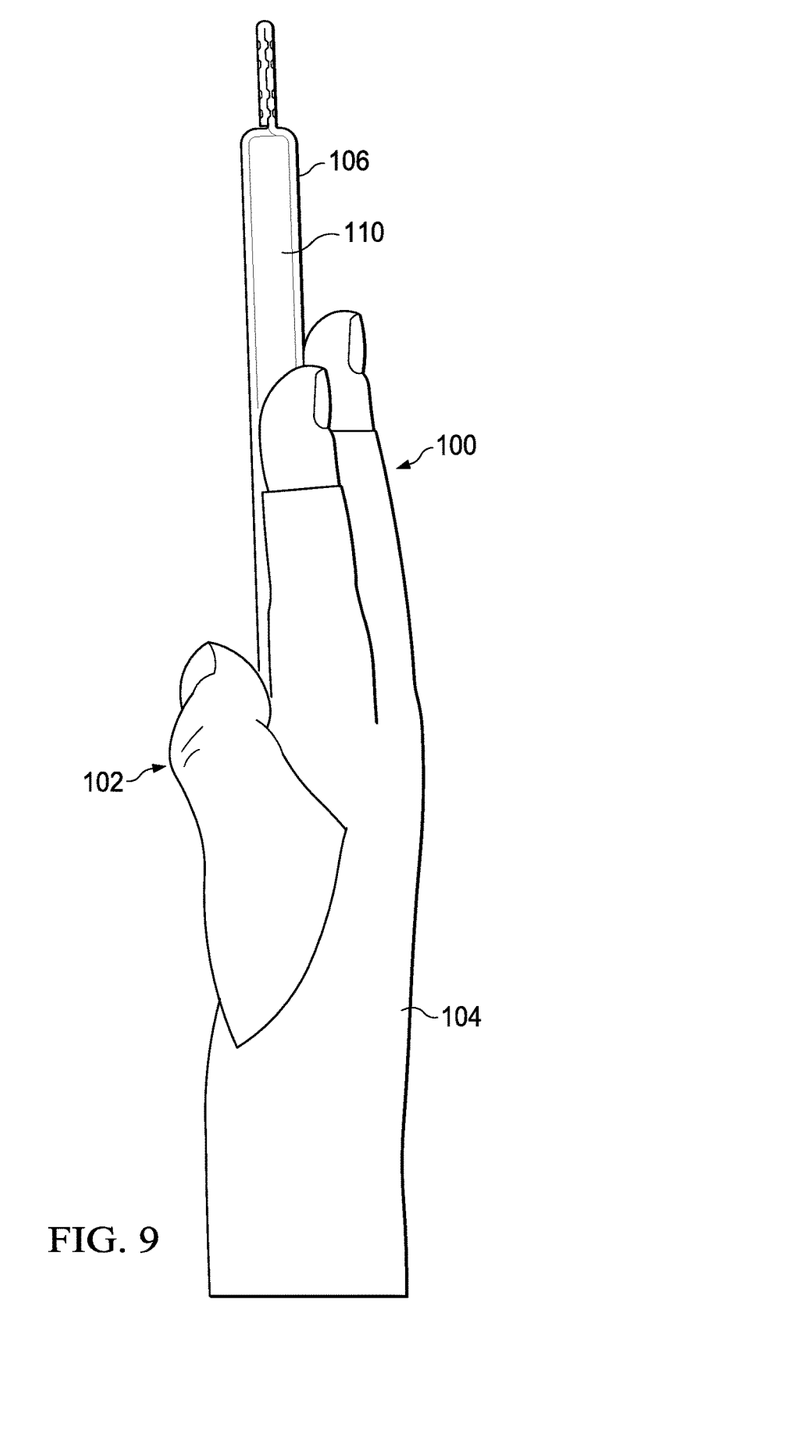
FIG. 9 is an illustration of a side view of a mobile phone glove.

With reference now to FIG. 9, an illustration of a side view of mobile phone glove 100 from FIG. 1 is depicted in accordance with an illustrative embodiment. As depicted, mobile phone 110 in receptacle 106 extends sufficiently beyond the fingers of hand 102 to allow the user to easily operate mobile phone 110 for a number of desired uses.

For example, with mobile phone glove 100, the user may be able to easily take photos using either a front-facing camera or a rear-facing camera associated with mobile phone 110. When the user is not using mobile phone 110, receptacle 106 holds mobile phone 110 in place relative to receptacle 106 and garment 104. Further, the user is still able to use his or her fingers when not using mobile phone 110.

Mobile phone glove 100 may be particularly suited for recreational uses. For example, a user may use mobile phone glove 100 to take mobile phone underwater in a pool, a lake, or the ocean. Receptacle 106 provides a watertight seal for mobile phone 110 while still allowing the user to operate mobile phone 110. In this manner, the user may be allowed to take photos using a camera of mobile phone 110 while the user is underwater.

The illustrations in FIGS. 1-9 are not meant to imply physical or architectural limitations to the manner in which an illustrative embodiment may be implemented. Other components in addition to or in place of the ones illustrated may be used. Some components may be optional.

For example, without limitation, in some cases, pocket material 300 in FIGS. 3-4 may include only enough material to form a flap, similar to second section 402 in FIG. 4. In these types of examples, a bottom edge and two side edges of the flap may be sewn onto garment 104 to create pocket 108 shown in FIG. 1. Further, although the illustrative examples above are described with respect to mobile phone 110, mobile phone glove 100 or a mobile device glove implemented in a manner similar to mobile phone glove 100 may be used with some other type of mobile device. The other mobile device may be a portable music player, a miniature tablet, or some other type of mobile device.

Further, hand 102 in FIG. 1 is a right hand of a user. However, in other illustrative examples, mobile phone glove 100 may be configured for use with the left hand of a person. Additionally, receptacle 106 may be configured to receive different shapes and/or sizes of mobile phones, depending on the implementation.

Thus, the illustrative embodiments provide mobile phone glove 100 that enables the user to secure mobile phone 110, which may be a smartphone, in the user's left hand or right hand, thereby eliminating the possibility of dropping mobile phone 110. Receptacle 106 of mobile phone glove 106 may keep mobile phone 110 secured to hand 102 even when the user is in motion or during high action movement of the body, arms or hands of the user.

Mobile phone glove 100 makes it easier to take pictures and videos within the display frame of mobile phone 110 without the concern of having to separately support mobile phone 110 with both hands. In other words, mobile phone glove 100 may help stabilize mobile phone 110 for the taking of pictures and/or video. Mobile phone glove 100 may be used to secure and stabilize mobile phone 110 when capturing selfie photos, selfie videos, or both while in motion.

In these illustrative examples, only one free hand is needed. With mobile phone glove 100 user does not need to use tension, pressure, or a gripping force to securely carry mobile phone 110. In this manner, stress, pressure, and/or anxiety caused by the insecurity of possibly dropping mobile phone 110 during the performance of certain tasks may be reduced.

Further, mobile phone glove 100 allows a user to operate all or nearly all of the normal functions of mobile phone 100 while mobile phone 100 is secured within receptacle 106.

Figure 10:
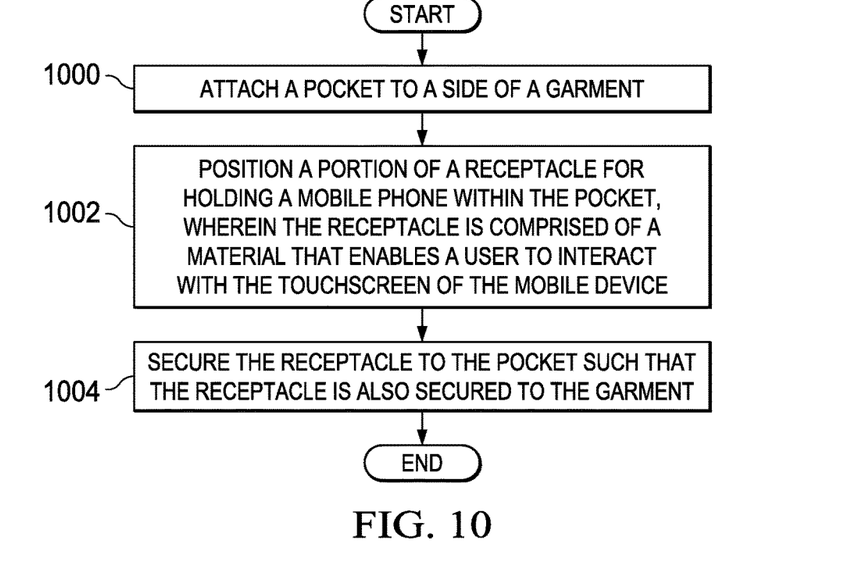
FIG. 10 is flowchart of process for making a mobile phone glove.

With reference now to FIG. 10, a flowchart of process for making a mobile phone glove is depicted in accordance with an illustrative embodiment. The process illustrated in FIG. 10 may be used to construct a mobile phone glove, such as, for example, without limitation, mobile phone glove 100 in FIG. 1.

The process may begin by attaching a pocket material to a side of a garment (operation 1000). Next, a portion of a receptacle for holding a mobile phone is positioned within an interior space formed by the pocket material (operation 1002). In operation 1002, the receptacle includes a material that enables a user to interact with the touchscreen of the mobile device.

Next, the receptacle is secured to the pocket material such that the receptacle is also secured to the garment (operation 1004), with the process terminating thereafter. Depending on the implementation, in operation 1004, the receptacle may be directly or indirectly attached to the garment.

Figure 11:
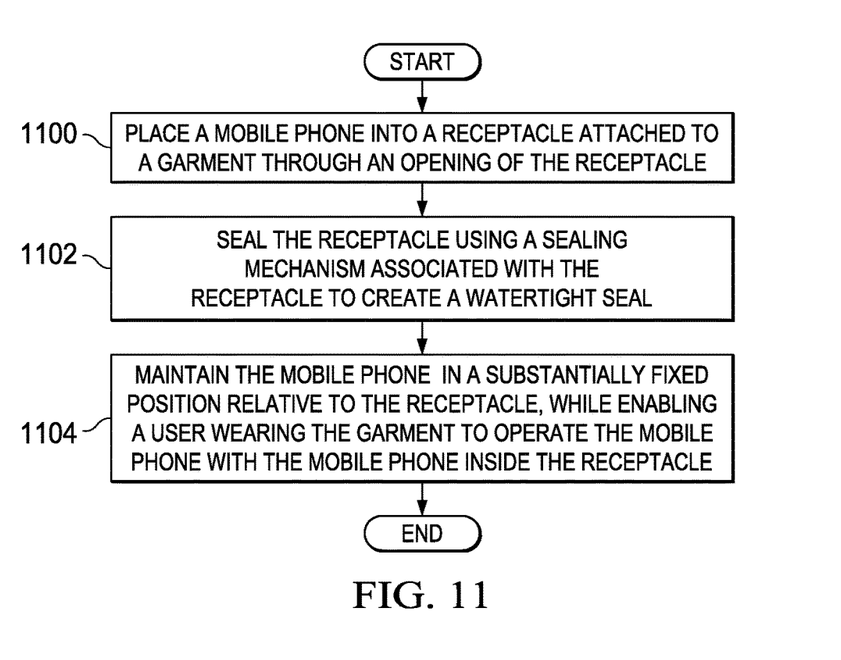
FIG. 11 is a flowchart of process for operating a mobile phone using a mobile phone glove.

With reference now to FIG. 11, a flowchart of process for operating a mobile phone using a mobile phone glove is depicted in accordance with an illustrative embodiment. The process illustrated in FIG. 1 may be used to operate a mobile phone, such as mobile phone 110 in FIG. 1, using a mobile phone glove, such as, for example, without limitation, mobile phone glove 100 in FIG. 1.

The process begins by placing a mobile phone into a receptacle attached to a garment through an opening of the receptacle (operation 1100). Next, the receptacle is sealed using a sealing mechanism associated with the receptacle to create a watertight seal (operation 1102). Thereafter, the mobile phone is maintained in a substantially fixed position relative to the receptacle, while enabling a user wearing the garment to operate the mobile phone with the mobile phone inside the receptacle (operation 1104), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a garment having a glove-type shape;
   a pocket attached to a side of the garment; and
   a receptacle for holding a mobile device that has a touchscreen, wherein the receptacle is attached to the garment through the pocket and is comprised of a material that enables a user to interact with the touchscreen of the mobile device; and
   a seal mechanism for making the receptacle watertight, wherein the seal mechanism comprises:
      a first plurality of interlocking members attached to the receptacle, wherein the first plurality of interlocking members comprises a first interlocking member positioned above an opening in the receptacle and a second interlocking member positioned below the opening in the receptacle; and
      a second plurality of interlocking members attached to the receptacle.

2. The apparatus of claim 1, wherein the mobile device is a mobile phone and wherein the garment, the pocket material, and the pouch form a mobile phone glove.

3. The apparatus of claim 1, wherein the pocket material comprises:
a first section; and
a second section that is attached to three sides of the first section of the pocket material to form an interior space for holding the receptacle and the mobile phone.

4. The apparatus of claim 3, wherein a portion of the receptacle is attached to both the first section of the pocket material and the second section of the pocket material.

5. The apparatus of claim 3, wherein the first section is formed by a portion of the side of the garment.

6. The apparatus of claim 3, wherein the second section has a hole configured to be positioned over a button of the mobile device when the mobile device is placed with the receptacle.

7. An apparatus comprising:
a garment having a glove-type shape;
a pocket attached to a side of the garment; and
a receptacle for holding a mobile device that has a touchscreen,
wherein the receptacle is attached to the garment through the pocket; and
wherein the receptacle is comprised of a material that enables a user to interact with the touchscreen of the mobile device;
a seal mechanism for making the receptacle watertight; wherein the seal mechanism comprises:
a first plurality of interlocking members attached to the receptacle; and
a second plurality of interlocking members attached to the receptacle; wherein the second plurality of interlocking members comprises:
a first interlocking member positioned below an opening in the receptacle but above a fold area of the receptacle; and
a second interlocking member positioned below the fold area in the receptacle.

8. An apparatus comprising:
a garment having a glove-type shape;
a pocket attached to a side of the garment; and
a receptacle for holding a mobile device that has a touchscreen,
wherein the receptacle is attached to the garment through the pocket; and
wherein the receptacle is comprised of a material that enables a user to interact with the touchscreen of the mobile device;
a seal mechanism for making the receptacle watertight; wherein the seal mechanism comprises:
a first snap system comprising:
a first pair of interlocking members positioned above an opening in the receptacle; and
a second pair of interlocking members positioned below the opening in the receptacle; and
a second snap system comprising:
a third pair of interlocking members positioned below the opening in the receptacle but above a fold area of the receptacle; and
a fourth pair of interlocking members positioned below the fold area of the receptacle.

9. The apparatus of claim 1, wherein at least a portion of the material of the receptacle comprises at least one of touch-sensing, touch-sensitive, pressure-sensitive, or conductive.

10. A mobile phone glove comprising:
a garment having a glove-type shape;
a pocket attached to a side of the garment;
a receptacle for holding a mobile phone that has a touchscreen,
wherein the receptacle is attached to the garment through the pocket material such that the mobile phone is stabilized relative to the garment; and
wherein the receptacle is comprised of a touch-sensing material that enables a user to interact with the touchscreen of the mobile device; and
a seal mechanism for making the receptacle watertight, wherein the seal mechanism comprises:
a first plurality of interlocking members attached to the receptacle, wherein the interlocking members comprises: a first interlocking member positioned above an opening in the receptacle and a second interlocking member positioned below the opening in the receptacle; and
a second plurality of interlocking members attached to the receptacle.

11. The mobile phone glove of claim 10, wherein the garment has an opening to allow a thumb of a person to pass through the opening.

12. The mobile phone glove of claim 10, wherein the first plurality of interlocking members and the second plurality of interlocking members are interlocking plastic strips that are attached to the receptacle.

13. A method for making a mobile phone glove, the method comprising:
attaching a pocket to a side of a garment;
positioning a portion of a receptacle for holding a mobile phone within the pocket, wherein the receptacle is comprised of a material that enables a user to interact with a touchscreen of the mobile phone; and
securing the receptacle to the pocket such that the receptacle is also secured to the garment;
wherein securing the receptacle to the pocket comprises securing a first portion of the receptacle to both the first section of the pocket material and the second section of the pocket material such that a second portion of the receptacle extends past the pocket material;
wherein the receptacle comprises a watertight seal that comprises a first plurality of interlocking members attached to the receptacle and a second plurality of interlocking members attached to the receptacle, the first plurality of interlocking members comprising a first interlocking member positioned above an opening in the receptacle and a second interlocking member positioned below the opening in the receptacle.

14. The method of claim 13, wherein attaching the pocket comprises:
attaching a first section of a pocket material to the side of the garment; and
attaching a second section of the pocket to three sides of the first section of the pocket material to form the pocket.

15. The method of claim 13 further comprising:
securing a seal mechanism to the receptacle.

* * * * *